(12) United States Patent
Chevalley et al.

(10) Patent No.: US 9,586,492 B2
(45) Date of Patent: Mar. 7, 2017

(54) ELECTRIC CHARGING SYSTEM OF A PLURALITY OF ELECTRIC VEHICLES AND METHOD FOR DISTRIBUTING THE ELECTRIC POWER DELIVERED BY AN ELECTRIC POWER SUPPLY OF SUCH A SYSTEM

(71) Applicant: Schneider Electric Industries SAS, Rueil-Malmaison (FR)

(72) Inventors: Christian Chevalley, Lans en Vercors (FR); Claude Ricaud, Toulouse (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 184 days.

(21) Appl. No.: 14/322,168

(22) Filed: Jul. 2, 2014

(65) Prior Publication Data
US 2015/0008888 A1 Jan. 8, 2015

(30) Foreign Application Priority Data
Jul. 3, 2013 (FR) ..................................... 13 56493

(51) Int. Cl.
*H02J 7/14* (2006.01)
*H02J 7/00* (2006.01)
(Continued)

(52) U.S. Cl.
CPC ......... *B60L 11/1824* (2013.01); *B60L 11/185* (2013.01); *B60L 11/1816* (2013.01); *B60L 11/1844* (2013.01); *B60L 11/1846* (2013.01); *B60L 11/1861* (2013.01); *B60L 2240/547* (2013.01); *B60L 2240/549* (2013.01); *B60L 2240/70* (2013.01); *B60L 2240/80* (2013.01);
(Continued)

(58) Field of Classification Search
CPC .............. B60L 11/1838; B60L 11/1818; B60L 11/1846; B60L 11/1862
USPC ........................... 320/104, 109, 137; 701/22
See application file for complete search history.

(56) References Cited

U.S. PATENT DOCUMENTS

| | | | |
|---|---|---|---|
| 4,383,210 A | 5/1983 | Wilkinson | |
| 6,198,251 B1 * | 3/2001 | Landon | ............... B60L 11/1816 320/109 |

(Continued)

FOREIGN PATENT DOCUMENTS

| | | |
|---|---|---|
| WO | WO 2012/146306 A2 | 11/2012 |
| WO | WO 2012/149965 A1 | 11/2012 |

*Primary Examiner* — M'Baye Diao
(74) *Attorney, Agent, or Firm* — Oblon, McClelland, Maier & Neustadt, L.L.P.

(57) ABSTRACT

This electric charging system (10) of a plurality of electric vehicles (12) comprises, an electric power supply (14) suitable for delivering a maximum electric power, and a plurality of charging points (18). Each charging point (18) is suitable for being connected to an electric vehicle (12) and delivering a plurality of electric power levels. The system (10) comprises, for each charging point (18), a control device (20) for controlling the electric power level delivered. The control devices are connected to each other by communication links (30) and are suitable for controlling the distribution of the maximum power between the charging points as a function of time and the number of electric vehicles (12) connected to the charging points (18) and requiring charging.

14 Claims, 10 Drawing Sheets

(51) Int. Cl.
 *B60L 11/00* (2006.01)
 *B60L 11/18* (2006.01)
(52) U.S. Cl.
 CPC ............ *Y02T 10/7005* (2013.01); *Y02T 10/92* (2013.01); *Y02T 90/16* (2013.01)

(56) References Cited

U.S. PATENT DOCUMENTS

| | | | |
|---|---|---|---|
| 8,106,627 B1 | 1/2012 | Rossi | |
| 8,229,615 B2 * | 7/2012 | Sakamoto | B60K 6/365 |
| | | | 180/65.21 |
| 8,378,627 B2 * | 2/2013 | Asada | H02J 7/0027 |
| | | | 180/65.29 |
| 8,952,656 B2 * | 2/2015 | Tse | H02J 7/0013 |
| | | | 320/104 |
| 9,156,364 B2 * | 10/2015 | Miller | H02J 5/005 |
| 2003/0014315 A1 * | 1/2003 | Jaalinoja | G06Q 20/045 |
| | | | 705/18 |
| 2010/0082277 A1 * | 4/2010 | Ballard | B60L 11/1809 |
| | | | 702/63 |
| 2010/0114798 A1 * | 5/2010 | Sirton | B60L 11/1816 |
| | | | 705/412 |
| 2010/0134067 A1 | 6/2010 | Baxter et al. | |
| 2011/0004358 A1 * | 1/2011 | Pollack | B60L 11/1842 |
| | | | 700/297 |
| 2011/0109266 A1 | 5/2011 | Rossi | |
| 2011/0316482 A1 | 12/2011 | Baxter et al. | |
| 2012/0139486 A1 * | 6/2012 | Holland | H02J 7/045 |
| | | | 320/109 |
| 2012/0153896 A1 | 6/2012 | Rossi | |
| 2012/0235646 A1 * | 9/2012 | Lo | H02J 7/0027 |
| | | | 320/137 |
| 2013/0076304 A1 * | 3/2013 | Andersson | A01D 34/008 |
| | | | 320/107 |
| 2013/0141043 A1 | 6/2013 | Rossi | |
| 2013/0211988 A1 * | 8/2013 | Dorn | B60L 11/1838 |
| | | | 705/35 |
| 2013/0310999 A1 | 11/2013 | Baxter et al. | |
| 2014/0084874 A1 | 3/2014 | Eger et al. | |
| 2014/0249976 A1 * | 9/2014 | Sugimura | G06Q 50/06 |
| | | | 705/34 |
| 2014/0369431 A1 * | 12/2014 | Ma | B60L 11/1816 |
| | | | 375/257 |

* cited by examiner

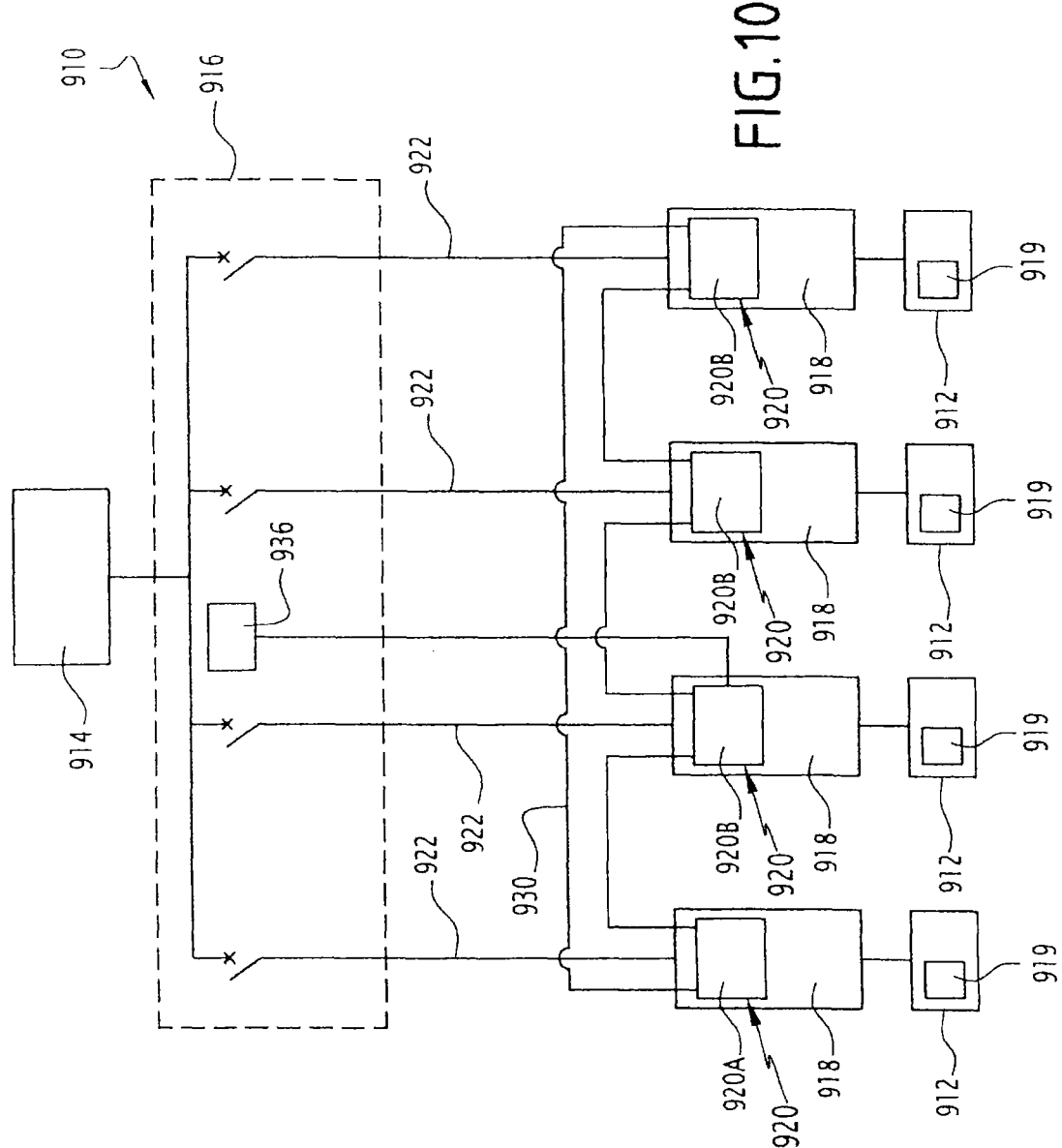

ELECTRIC CHARGING SYSTEM OF A PLURALITY OF ELECTRIC VEHICLES AND METHOD FOR DISTRIBUTING THE ELECTRIC POWER DELIVERED BY AN ELECTRIC POWER SUPPLY OF SUCH A SYSTEM

The present invention relates to an electric charging system of a plurality of electric vehicles, and a method for distributing the electric power delivered by an electric power supply of such a system.

In a system for charging a fleet of electric vehicles, the power delivered is limited by the subscribed power with energy providers and by the installed power. The installed power corresponds to the capacity of the electric cables of the system and the protective gauges, such as circuit breakers, against surges.

Furthermore, to reduce consumption peaks, energy providers apply pricing incentives so that, for examples, their customers offset their consumption over time.

An ongoing issue in the field of electric charging systems of a fleet of electric vehicles is thus that of adapting the power delivered by charging points.

It is thus known to overproportion the charging system or increase the subscribed power to be capable of recharging each electric vehicle connected to the system as quickly as possible, regardless of the number of electric vehicles. This involves significant additional costs, since the system is designed for an extreme scenario, where each of the charging points of the system is connected to an electric vehicle and delivers the maximum electric power that it is capable of receiving thereto.

Moreover, it is also known to perform manual electric vehicle charging control, but this incurs a risk of electric overcharging and disjunction, and remains complex in terms of labour.

Furthermore, in the field of energy managers for building consumption monitoring systems, it is known to use load-shedding devices, enabling when the consumption is greater than the subscribed power with an energy provider, or when seeking to reduce the building consumption, to offload some outputs, i.e. switch off the electric power supply delivered to some parts of the building. Applied to the field of electric vehicle charging, this consists of switching off the electric power supply of some points when seeking to reduce the consumption of the charging system. However, it is known that an electric vehicle cannot withstand more than three interruptions in a charging cycle, whereas a load-shedding device is suitable for switching off the charging cycle by switching off the electric power supply of a point. There is thus a risk of damage if the load-shedding is too frequent. Furthermore, this type of system is not automatically adapted to the number of electric vehicles connected to the system.

The aim of the invention is thus that of providing an electric charging system of a plurality of electric vehicles that is inexpensive, not complex to use and carry out and enabling the simultaneous use of all the points of the charging system, by limiting to a predetermined power, such as the subscribed power with an energy provider, the total power supplied to the electric vehicles connected to the system.

For this purpose, the invention relates to an electric charging system of a plurality of electric vehicles, said system comprising:
- an electric power supply suitable for delivering a maximum electric power,
- a plurality of charging points, each being suitable for being connected to an electric vehicle and recharging a battery of said electric vehicle, and delivering a plurality of electric power levels, via a corresponding electric line, to the electric power supply,
- for each charging point, a device for controlling the electric power level delivered by the charging point to the electric vehicle connected thereto, the control device being suitable for transmitting a control signal to the corresponding charging point, said electric power level delivered being dependent on said control signal.

According to the invention, the control devices are connected to each other by communication links and are suitable for controlling the distribution of the maximum power between the charging points as a function of time and the number of electric vehicles connected to the charging points and requiring charging.

By means of the invention, distribution of the first maximum power delivered by the electric power supply of the electric charging system is performed between the charging points, and varies as a function of time and the number of electric vehicles connected to the charging points. It is thus possible to continuously maximise the power delivered by each charging point to an electric vehicle connected thereto, and simultaneously use all the points of the charging system, by adapting the power delivered by each point to the number of vehicles connected to the charging system.

According to further advantageous aspects of the invention, the electric charging system further comprises one or a plurality of the following features, taken in isolation or according to any technical admissible combinations:
- each control device is connected, via the communication links, to two control devices, the set of control devices forming a chained link, corresponding to a closed communication loop,
- the communication between the control devices is a point-to-point type communication, whereas the control devices are suitable for being configured in master or slave mode, and while the system merely comprises one control device configured in master mode,
- the control device configured in master mode is connected to an electric meter, whereas based on information received from the electric meter, the control device configured in master mode is suitable for communicating with the control devices configured in slave mode to modify the maximum power consumable by the facility by modifying the distribution of the maximum power,
- the system comprises a bidirectional electric link between each charging point and each corresponding control device, whereas the charging point is suitable for indicating to the corresponding control device that an electric vehicle is connected thereto and that the electric vehicle requires charging of its battery,
- each control device comprises a current sensor (24) suitable for measuring the current flowing through the corresponding electric line and detecting the connection of a vehicle to the corresponding charging point and the charging of said vehicle based on the value of said current,
- each charging point comprises the corresponding control device.

The invention also relates to a method for distributing the electric power delivered by an electric power supply of an electric charging system of a plurality of electric vehicles, the electric power supply being suitable for delivering a maximum electric power, the charging system comprising: a plurality of charging points, each being suitable for being connected to an electric vehicle and for recharging a battery of said electric vehicle, and for delivering a plurality of electric power levels, each charging point being connected, via a corresponding electric line, to the electric power supply, and for each charging point, a device for controlling the electric power level delivered by the charging point to an electric vehicle connected thereto. The method comprising the following step:

a) transmission by each control device of a control signal to the corresponding charging point, said delivered electric power level being dependent on said control signal.

According to the invention, the method comprises the following steps:

b) establishing communication between the control devices via communication links, c) controlling by means of the control devices the distribution of the maximum power between the charging points as a function of time and the number of electric vehicles connected to the charging points and requiring charging.

According to further advantageous aspects of the invention, the method for distributing the electric power further comprises one or a plurality of the following features, taken in isolation or according to any technical admissible combinations:

during step a) each control device controls the corresponding charging point via the control signal such that the corresponding charging point delivers at least a minimum electric power when a vehicle is connected thereto and requires charging of its battery, during step b) charging tokens are generated whereas during steps b) and c) the charging tokens circulate between the control devices on the communication links, whereas each charging token is associated with a partial power, corresponding to a subdivision of the maximum power, the sum of the partial powers associated with the charging tokens being less than or equal to the maximum power, during step c), when a control device receives a charging token, it uses the charging token received only if it is already using a number of charging tokens less than a maximum authorised number and when the corresponding charging point is connected to an electric vehicle requiring charging of its battery, whereas otherwise the control device transmits the charging token to another control device via the communication links, when, during step c) a control device uses a charging token, then it stores same for a predetermined allocation time before forwarding same to another control device via the communication links and it allocates, via the control signal, the corresponding partial power, to the corresponding charging point during the allocation time, each control device is connected, via the communication links, to two control devices, the set of control devices forming a chained link, corresponding to a closed communication loop, whereas during steps b) and c), the charging tokens circulate in a single direction between the control devices via the communication links, during step c), if a control device detects the start of charging of a battery of an electric vehicle connected to the corresponding charging point or the end of charging of the battery of said electric vehicle, a synchronisation token is transmitted by the control device to the other control devices, the synchronisation token circulating in a single direction between the control devices, whereas when receiving the synchronisation token, the control devices holding a charging token reset the allocation time to a latency time, the synchronisation token being transmitted from control device to control device, the synchronisation token is deleted by the control device, which generated the synchronisation token, when it receives the synchronisation token.

The invention will be understood better and further advantages thereof will emerge more clearly in the light of the following description, given merely as a non-limiting example, with reference to the appended figures, wherein:

FIG. 10 is a similar view to that in FIG. 1 according to a third embodiment of the invention.

Figure 1:
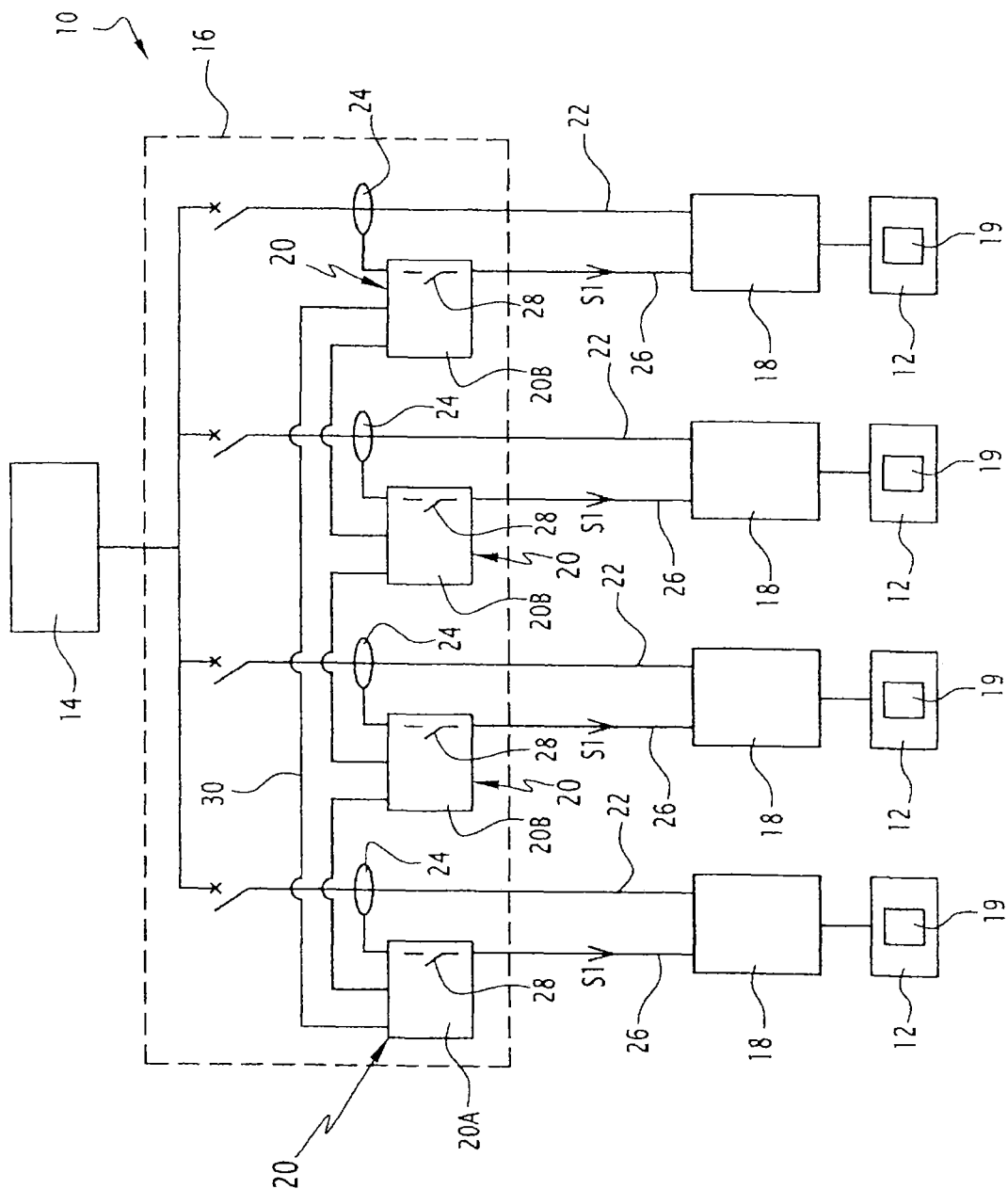
FIG. 1 is a schematic representation of an electric charging system of a plurality of electric vehicles, according to a first embodiment of the invention.

In FIG. 1, an electric charging system 10 of a plurality of electric vehicles 12 comprises an electric power supply 14, an electric panel 16 and four charging points 18.

In the example in FIG. 1, four electric vehicles 12 are each connected to a different charging point 18 and each comprise an electric battery 19 and a charger, not shown, suitable for charging the corresponding battery 19 by means of a current received by the charger from the corresponding charging point 18.

The electric power supply 14 is connected to the charging points 18 according to a star design. The electric power supply 14 is suitable for delivering a maximum electric power P1max to the charging points 18, the first maximum power P1max corresponding to a total power that the electric power supply 14 is suitable for supplying to the charging points 18. The first maximum power P1max generally corresponds to a total subscribed power with an energy distributor or fixed by the energy distributor.

The electric panel 16 comprises a control device 20 for each charging point 18, the control device 20 being suitable for being set to master or slave mode using a setting device, not shown, such as a two-position movable switch. More specifically, the electric panel 16 comprises a single control device 20A configured in master mode, also known as the master control device 20A, the remainder of the control devices being control devices 20B configured in slave mode, also known as slave control devices 20B.

Each charging point 18 is suitable for being connected to an electric vehicle 12 and recharging the battery 19 of the vehicle 12 via the corresponding charger. Each point 18 is also suitable for delivering a plurality of levels of electric power. Each charging point 18 is, for example, suitable for delivering two power levels, i.e. a first power level P1 and a second power level P2, having a value greater than that of the first power level P1.

Each charging point 18 is connected via a first corresponding electric line 22 to the electric power supply 14.

Each control device 20 comprises a current sensor 24 suitable for measuring the current flow through the corresponding electric line 22.

Each control device 20 is connected via a second corresponding electric line 26 to the corresponding charging point 18.

Each control device comprises a contact 28.

The control devices 20 are connected together via communication links 30. More specifically, each control device 20 is connected, via two communication links 30, to two control devices 20 corresponding to a previous control device and a next control device. The set of control devices 20 thus forms a chained link corresponding to a closed communication loop. The control devices 20 thus communicate in a network.

The control devices 20 are suitable via the contact 28 thereof and the second electric line 26 for controlling the corresponding charging point 18. The control devices 20 are more particularly suitable for controlling the distribution of the first maximum power P1max from the electric power supply 14 between the charging points 18, as a function of time and the number of electric vehicles 12 connected to the charging points 18 and requiring charging. A vehicle requires charging when the corresponding battery 19 is not charged and the corresponding charging point 18 is suitable for delivering at least the first power level P1.

Each control device 20 is identified using a specific address thereof.

The first power level P1 corresponds to the minimum power delivered by a charging point 18 so as not to interrupt the charging cycle in progress. It also corresponds to the power delivered to enable the start of a charging cycle once an electric vehicle 12 is connected to the charging point 18. The first power level P1 is for example equal to 1.5 kilowatts (kW).

The second power level P2 corresponds to a power delivered by a charging point 18 to optimise the charging time of the electric vehicle 12 connected thereto. The value of the second power level P2 is greater than that of the first power level P1. The second power level P2 is, for example between 3 kW and 22 kW.

Each contact 28 is suitable for controlling via a control signal S1 the corresponding charging point. The contact 28 is movable between a first position corresponding to the first power level P1 and a second position corresponding to the second power level P2. In the first position thereof, the movable contact 28 is thus suitable for controlling charging at the first power level P1 and in the second position thereof, the movable control 28 is suitable for controlling charging at the second power level P2.

The control signal S1 is transmitted via the second electric line 26.

Each charging point 18 is at all times suitable for delivering the first power level P1 if a vehicle 12 is connected thereto and requires charging of the battery 19 thereof. Indeed, before a vehicle is connected to each charging point 18, the corresponding movable contact 28 is in the first position thereof and enables charging at the first power level P1. The first power level P1 is thus assigned to each charging point 18 by default, and when connecting an electric vehicle 12, the charging point 18 consumes at least an equivalent power to the first power level P1 once charging is enabled by the vehicle 12 and the charging cycle has started.

Each current sensor 24 is suitable for determining whether the corresponding charging point 18 is connected to a vehicle 12 and is performing a charging cycle or not. Indeed, when a charging point 18 is free, i.e. not connected to any vehicle 12, or when it is connected to a vehicle 12 but no charging cycle is in progress since said vehicle 12 does not require charging, it consumes a third power level Pb considerably less than the first power level P1 and the second power level P2, which are delivered by the charging point 18 when a vehicle is connected thereto and charging. The third power level Pb is, for example, equal to some tens of watts. More generally, the third power level Pb has a value less than a few percent, for example 3%, of the value of the first power level P1.

The maximum number N of electric vehicles 12 suitable for being simultaneously supplied with the second power level P2 is calculated with the following formula:

$$N=(P1\text{max}-Pb\times B-P1\times B)/(P2-P1),$$

where B is the total number of charging points 18, the third power level Pb being negligible relative to the first and the second power level P1, P2.

Given that the third power level Pb is considerably less than the first power level P1, the control device 20 will not account for the third power level Pb consumed by each charging point 18 hereinafter in the description.

The maximum number N is configured in the master control device 20A, for example using a thumbwheel, not shown. Alternatively, the maximum number N is calculated by a computing unit, not shown, pertaining to the system 10.

According to the position of the movable contact 28, the control signal S1 is in the high state, corresponding to the first power level P1, or in the low state corresponding to the second power level P2, and the authorised power level delivered by the corresponding charging point 18 is then the first power level P1 or the second power level P2. In this way, when the movable contact 28 is in the first position, corresponding to the high state of the signal S1, the corresponding charging point 18 transmits a slow charging set-point to the electric vehicle 12 connected thereto and when the movable contact 28 is in the second position, corresponding to the low state of the signal S1, the corresponding charging point 18 transmits a fast charging set-point to the electric vehicle 12 connected thereto.

Alternatively, the concept in respect of low state and high state being conventional, the high state of the control signal S1 corresponds to the first power level P1 and the low state of the control signal S1 corresponds to the second power level P2.

During the method for distributing the electric power delivered by the charging system 10 to the electric vehicles 12, in order to perform the communication between the control devices via the communication links 30 and distribute the first maximum power P1max between the charging points 18, each control device 20 has two possible operating modes, an initialisation mode R1 and a nominal mode R2 and four types of tokens J1, J2, J3, J4 circulate on the communication network, formed by the control devices 20 and the communication lines 30.

The initialisation mode R1 corresponds to the start-up of the system 10, on the power-up of the control device 20.

The nominal mode R2 corresponds to the operating mode of each control device 20 once it has exited the initialisation mode thereof.

The tokens J1, J2, J3, J4 circulate on the communication links 30 in a single direction.

The four types of token are:

- an addressing token J1 created by the master control device 20A during the initialisation mode R1. The addressing token comprises a first ADDRESS variable and enables each control device to automatically allocate an address in the communication network. The addressing of the control devices 20 is necessary to individually identify the control devices 20. The addressing token J1 is deleted by the master control device 20A when receiving same in return, after it has passed through all the other control devices 20, i.e. all the slave control devices 20B,

- an end of initialisation token J2 created by the master control device 20A and transmitted by each control device 20 to the next control device 20 at the end of the initialisation mode R1 thereof. The end of initialisation token J2 enables each control device 20 to signal to the next control device 20 that it has completed the initialisation thereof. The end of initialisation token is deleted by the master control device 20A when it receives same in return, after it has transited via all the slave control devices 20B,

- charging tokens J3 created by the master control device 20A. Each charging token J3 comprises a partial power value P' equal to the difference between the second power level P2 and the first power level P1. More specifically, the first maximum power level P1max is divided into power ranges, the value of each being equal to the first power level P1 or to the value of the partial power P'. This gives, as seen above, ignoring the third power level Pb: P1max=N×P'+B×P1. Each partial power P' is associated with a charging token J3 suitable for circulating via the communication links 30. Each charging token J3 is also associated with an allocation time Ta, corresponding to the time during which the control device 20, when it receives the charging token, is suitable for using and storing same. More specifically, the allocation time Ta corresponds to the time during which the control device is suitable for storing the charging token J3 and allocating to the corresponding charging point 18 the additional partial power P'. Indeed, when using and storing a charging token J3, the control device 20 indicates to the corresponding charging point 18, by changing the position of the movable contact 28 and moving same to the second position thereof, that it is authorised to deliver the second power level P2,

- a synchronisation token J4 created by one of the control devices 20 on starting and completing a charging cycle on the corresponding charging point 18. Indeed, this event gives rise to a further distribution of the charging tokens J3 once the number of vehicles 12 charging at the first P1 or second P2 power level increase or decreases. On receiving the synchronisation token J4 all the control devices 20 wherein the corresponding charging points 18 are charging with the second power level P2 reset the allocation time Ta to a latency time T1. This means that the control devices 20 charging at the second power level P2 store and use the token J3 thereof for the latency time T1. This arrangement makes it possible to limit to the latency time T1 the maximum standby time before a further distribution of the charging tokens J3. This makes it possible to start charging a further vehicle 12 more quickly. The synchronisation token J4 is deleted by the control device 20 creating same when received in return, given that, once created, the synchronisation token J4 is transmitted from control device to control device. The synchronisation token J4 also makes it possible to resynchronise the set of control devices 20 on the activation of the charging timer at the power level P2, corresponding to the allocation time Ta. In this way, the average holding time of a charging token J3 is overall the same for each control device 20.

Figure 2:
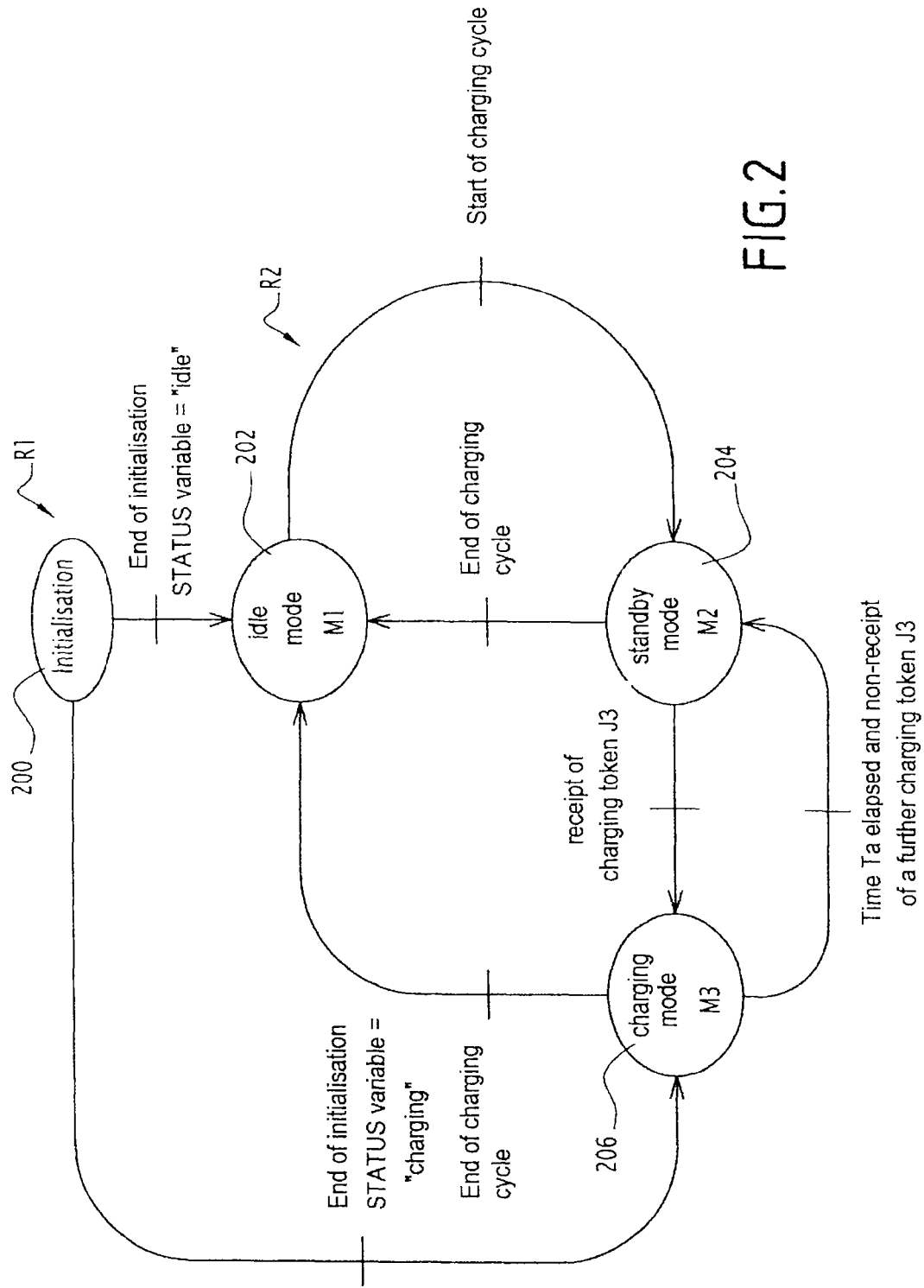
FIG. 2 is a flow chart representing the relationships between various operating modes of control devices belonging to the system in FIG. 1, during the application of a method for distributing power according to the invention.

FIG. 2 shows the various operating modes R1, R2 of the control devices 20. During these operating modes, each control device 20 comprises a second STATUS variable suitable for having the following three possible values: "idle", "standby", "charging".

When the second STATUS variable of one of the control devices 20 is at the "idle" value, there is no charging in progress carried out by the corresponding charging point 18. When the second STATUS variable of one of the control devices 20 is at the "standby" value, the corresponding charging point 18 delivers the first power level P1 and the corresponding control device 20 is on standby for a charging token J3. When the second STATUS variable of one of the control devices 20 is at the "charging" value, the control device 20 stores and uses a charging token J3 and the corresponding charging point 18 delivers the second power level P2.

When starting up the charging system 10, each control device 20 is successively in initialisation mode R1. Each control device 20 successively performs an initialisation step 200, the master control device 20A carrying out this initialisation step 200 first. During and at the end of the initialisation step 200, each control device 20 has the second STATUS variable thereof either at the "idle" value or the "charging" value. Then following the initialisation step 200, the control device 20 transmits an end of initialisation step to the next control device 20 and enters the nominal operating mode R2 thereof. Once each slave control device 20B has performed the step 200, the last slave control device 20B to have performed this step 200 transmits to the master control device 20A the end of initialisation token which deletes same and all the control devices 20 are in the nominal operating mode R2 thereof.

In the nominal operating mode R2 thereof, each control device 20 has according to the value of the second STATUS variable three possible operating modes: an idle operating mode M1, corresponding to a step 202, a standby operating mode M2 corresponding to a step 204 and a charging operating mode M3 corresponding to a step 206. The steps 202, 204 and 206 will be detailed hereinafter and the conditions for switching from one step to another will also be described.

The initialisation mode R1 takes place when the charging system 10 is switched on. During operation in initialisation mode, the master control device 20A is different to the operation of the slave control device 20B.

Figure 3:
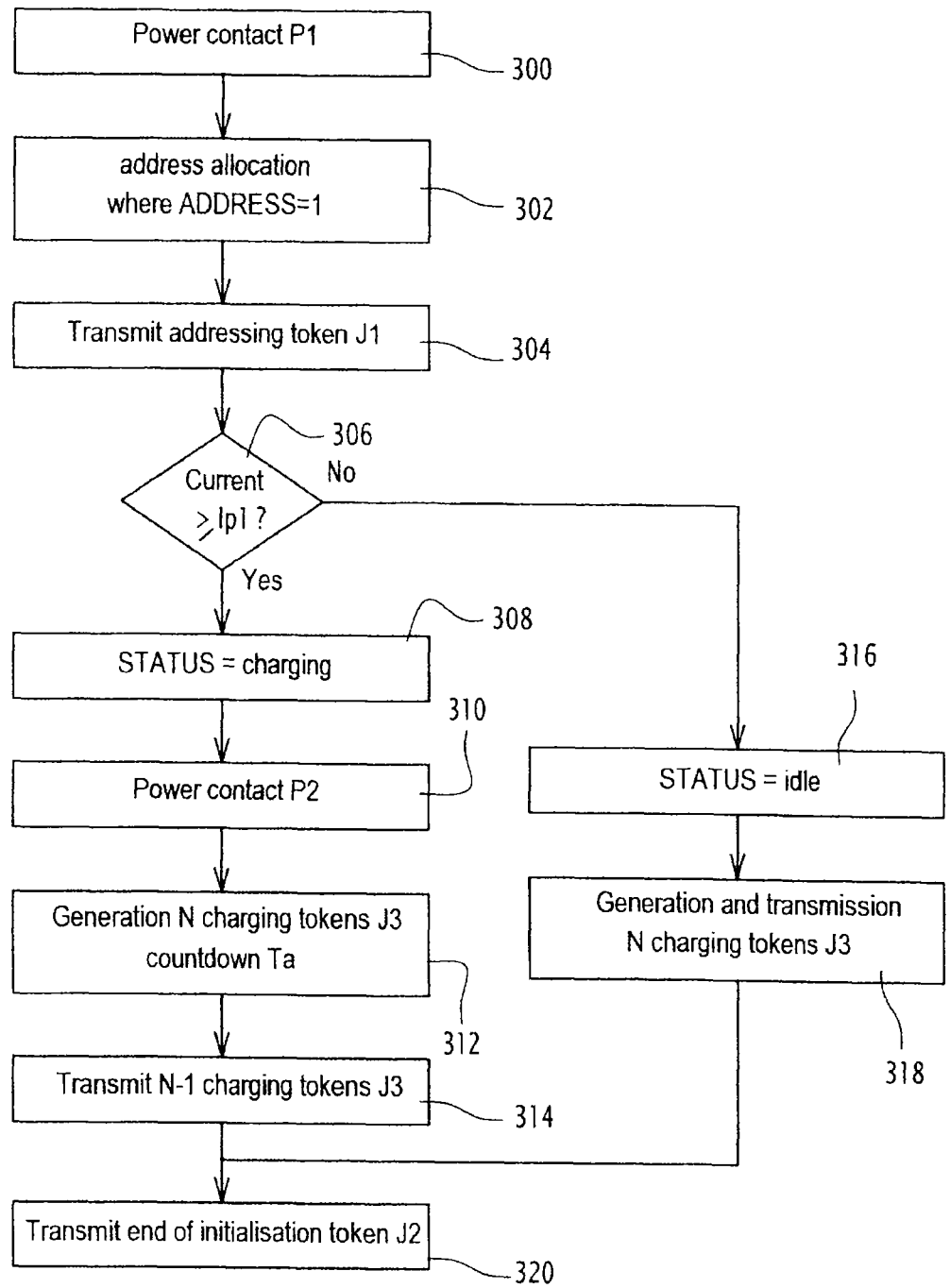
FIG. 3 is a flow chart representing the various steps performed by a control device configured in master mode, during an initialisation operating mode and during the application of the method for distributing power according to the invention.
Figure 4:
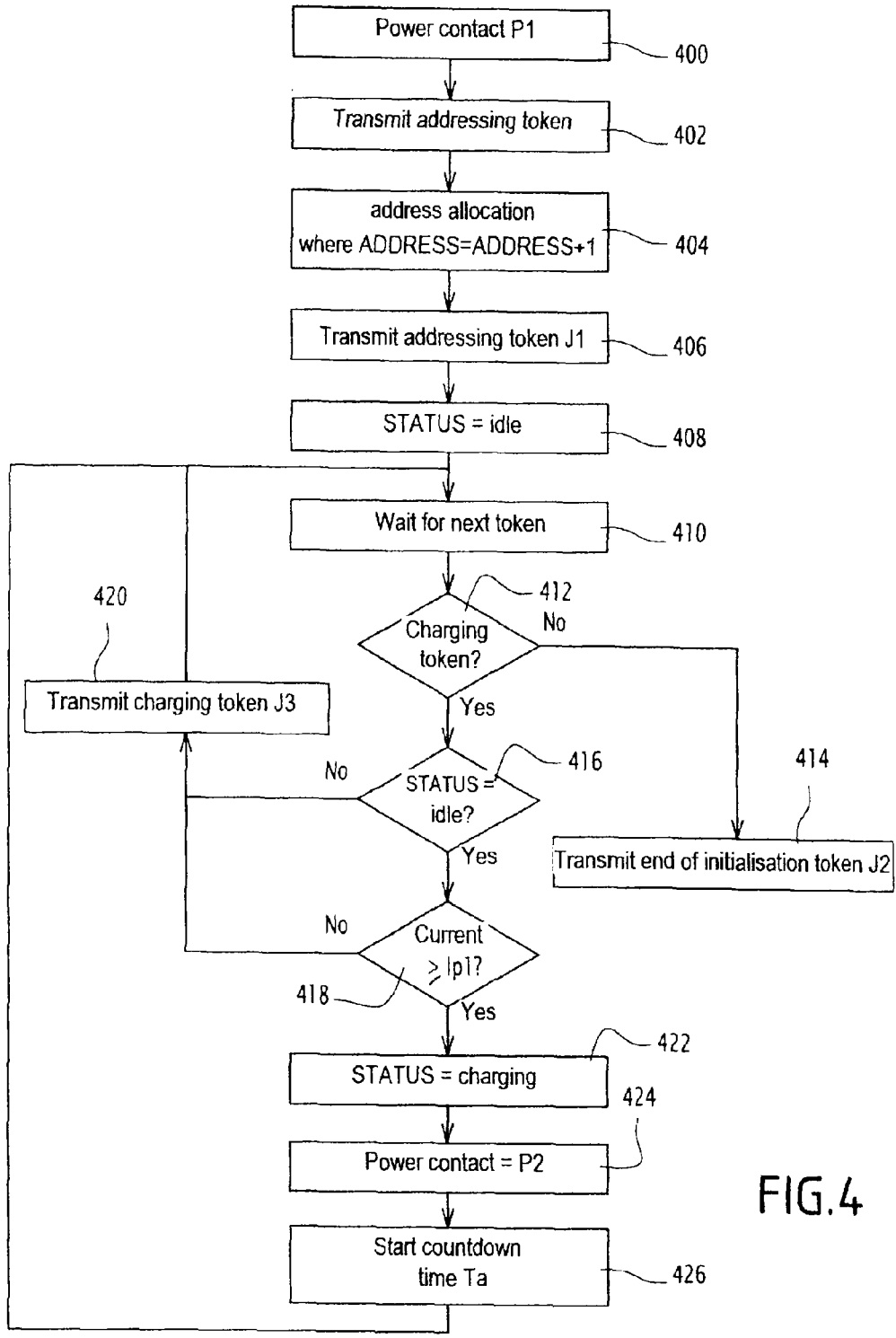
FIG. 4 is a flow chart representing the various steps performed by a control device configured in slave mode, during an initialisation operating mode and according to the application of the method for distributing power according to the invention.

The operation of the master control device 20A in the initialisation mode is represented in FIG. 3.

During a step 300, the movable contact 28 is positioned in the first position thereof. Then during a step 302, the master control device 20A sets the address thereof to the value 1, and during a following step 304, generates an addressing token wherein the first ADDRESS variable is equal to 1 and transmits same to the next slave control device 20B. Then, during a step 306, the control device 20 tests whether a current sensor 24 measures a current greater than or equal to a first charging current Ip1, i.e. whether a vehicle 12 is connected to the corresponding charging point 18 and charging at a power level greater than or equal to the first power level P1.

If a current greater than or equal to the first charging current Ip1 is measured, the second STATUS variable of the master control device 20A switches to the "charging" value during a step 308 and the movable contact 28 is moved to the second position thereof during a step 310. During a next step 312, the master control device 20A generates N charging tokens J3, uses one and starts the countdown of the allocation time Ta. Then, during a step 314, the master control device 20A transmits N−1 charging tokens J3 to the next slave control device 20B.

If a current considerably less than the first charging current Ip1, for example ten times lower, is measured, the second STATUS value of the master control device 20A changes to the "idle" value, during a step 316 and generates and then transmits N charging tokens J3 to the next slave control device 20B during a step 318.

Following the step 314 and the step 318, the master control device 20A generates and transmits to the next slave control device 20B, during a step 320, the end of initialisation token J2.

The master control device 20A deletes the end of initialisation token J2 when it receives same in return.

Following the step 320, the master control device 20A enters the nominal operating mode R2, and the corresponding second STATUS variable either has the "idle" value or the "charging" value, the master control device 20A then performs, as shown in FIG. 2, the step 202 or the step 206 respectively, i.e. the master control device 20A either enters into an idle operating mode M1 also known as idle mode M1, or a charging operating mode M3, also known as charging mode M3.

On switching on the charging system 10, each slave control device 20B operates in initialisation mode R1. In this way, during a first step 400, the movable contact 28 is moved to the first position thereof. Then during a following step 402, the corresponding slave control device 20B awaits the addressing token J1 transmitted by the previous control device 20. Then during a step 404, the slave control device 20B increments the value of the first ADDRESS variable contained in the addressing token J1 by one unit and sets the address thereof to this new value. The corresponding control device 20B then transmits during a step 406 the addressing token J1 to the next control device 20. Then, during a step 408, the slave control device 20B assigns to the second STATUS variable thereof, the "idle" value and awaits the next token during a step 410. In a step 412, the slave control device 20B tests whether the next token received in a charging token J3.

If the token received is different to a charging token J3, the slave control device 20B transmits the end of initialisation token J2 to the next control device 20 during a step 414 and the control device 20 exits initialisation mode R1.

If the token received ins a charging token J3, in a step 416, the slave control device 20B determines whether the second STATUS variable of the slave control device 20B has the "idle" value and, during a next step 418, the slave control device 20B tests whether the current sensor 24 measures a current greater than or equal to the first charging current Ip1.

If the second STATUS variable of the corresponding slave control device 20B is not equal to "idle", the charging token J3 is transmitted to the next control device 20 during a step 420 and the slave control device 20B returns to the step 410 awaiting the next token.

If the second STATUS variable of the corresponding slave control device 20B has the "idle" value, it goes to the step 418.

Following the step 418, if a current considerably less than the first charging current Ip1, for example ten times lower, is measured by the corresponding current sensor 24, the slave control device 20B goes to the step 420 for transmitting the charging token J3 received, then returns to the step 410 following the transmission of the charging token J3.

Following the step 418, if a current greater than or equal to the first charging current Ip1 is measured by the corresponding current sensor 24, the value of the second STATUS variable of the slave control device 20B changes to "charging" during a step 422 and the movable contact 28 is during a step 424 moved to the second position thereof. Finally, during a step 426, the slave control device 20B starts the countdown of the allocation time Ta and returns to the step 410 awaiting the next token.

After the corresponding control device 20B has transmitted the end of initialisation token J4 thereof during the step 414, it then switches to nominal mode R2, and the corresponding second STATUS variable either has the "idle" value, or the "charging" value, the slave control device 20B then performs, as shown in FIG. 2, the step 202 or the step 206 respectively, i.e. the slave control device 20B either enters idle mode M1 or charging mode M3.

Figure 5:
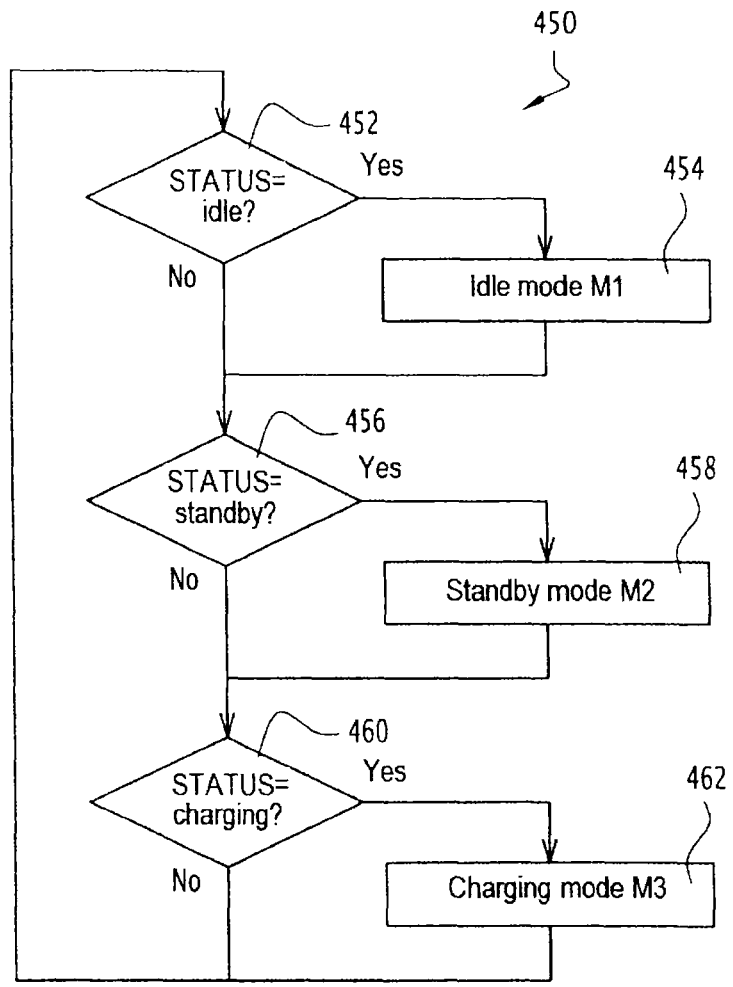
FIG. 5 is a flow chart representing the change from one operating mode to another performed by each control device, during a nominal operating mode and according to the method for distributing power according to the invention.

During operation in nominal mode R2, each control device 20 uses an algorithm 450 represented in FIG. 5 and corresponding to the application of the method for distributing electric power. This algorithm 450 corresponds to an infinite loop during which the control device 20 performs a first step 452 where the control device 20 tests whether the corresponding second STATUS variable has the "idle" value.

If the second STATUS variable of the control device 20 has the "idle" value, the control device 20 performs a step 454, similar to the step 202, of operation in idle mode, and the control devices 20 determines during a step 456 whether the second STATUS variable has the "standby" value.

If the second STATUS variable of the control device 20 has a value different to "standby", the control device 20 performs the step 456 directly.

Following the step 456, if the second STATUS variable is equal to the "standby" value, the control device 20 performs a step 458, similar to the step 204, of operation in standby mode, and it tests during a step 460 whether the second STATUS variable has the "charging" value.

Following the step 456, if the second STATUS variable has a value different to "standby", the control device 20 performs the step 460 directly.

Following the step 460, if the second STATUS variable is equal to the "charging" value, the control device 20 performs a step 462, similar to the step 206, of operation in charging mode and it returns to the step 452.

Following the step 460 if the second STATUS variable has a value different to "charging", the control device 20 returns to the step 452.

Figure 6:
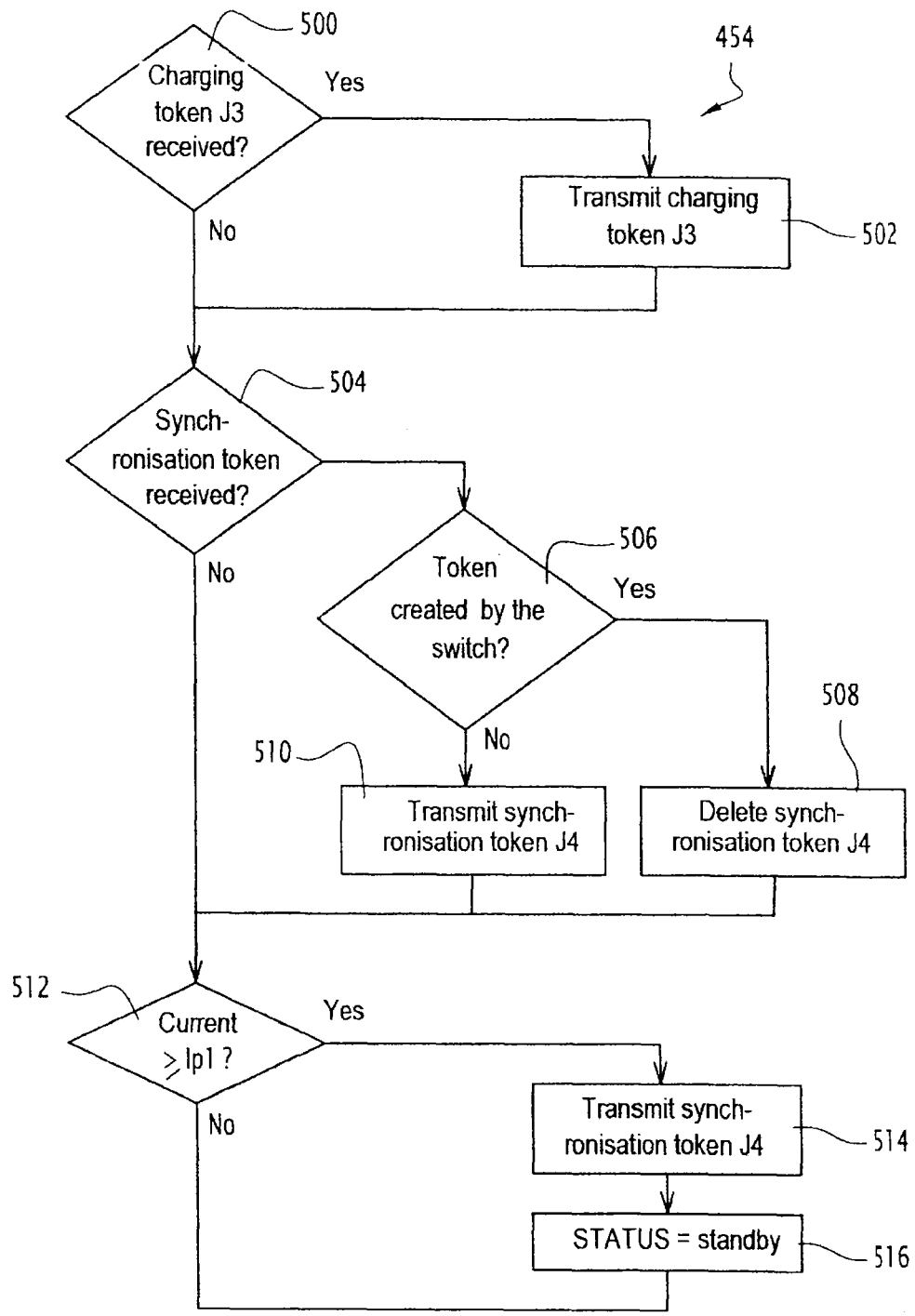
FIG. 6 is a flow chart representing the various steps performed by each control device, during a nominal operating mode and in idle mode.

The algorithm used in idle mode corresponding to the step 454 and to the step 202 is represented in FIG. 6. During operating in idle mode, the control device performs a first step 500 during which it tests whether it has received a charging token J3 or not.

If the control device 20 has received a charging token J3, it transmits same to the next control device during a step 502, and performs a step 504 during which it determines whether a synchronisation token J4 has been received.

If the control device 20 has received a token other than the charging token J3, it goes directly to the step 504.

Following the step 504, if the token received is a synchronisation token J4, then the control device 20 tests during a step 506 whether it has created the synchronisation token J4 received and if so, it deletes same during a step 508 and, otherwise, transmits same to the next control device 20 during a step 510. Following the steps 508 and 510, the control device performs a step 512, where it determines whether the current sensor 24 measures a current greater than or equal to the first charging current Ip1.

Following the step 504, if the token received is a token other than a synchronisation token J4, then the control device 20 performs the step 512 directly.

If a current considerably less than the first charging current Ip1, for example ten times lower, is measured by the current sensor 24, then the control device 20 exits idle operating mode and goes to the step 456 shown in FIG. 5.

If a current greater than or equal to the first charging current Ip1 is measured by the current sensor 24 then, during a step 514, the control device 20 generates a synchronisation token J4 and transmits same to the next control device 20. This corresponds to the time when a vehicle is connected to the corresponding point 18 and has started a charging cycle, i.e. an additional vehicle is connected to the charging system 10. Then, during a next step 516, the second STATUS variable adopts the "standby" value, the control device 20 then switches to operation in standard mode M2. The control device 20 then exits idle mode and goes to the step 456 shown in FIG. 5.

Figure 7:
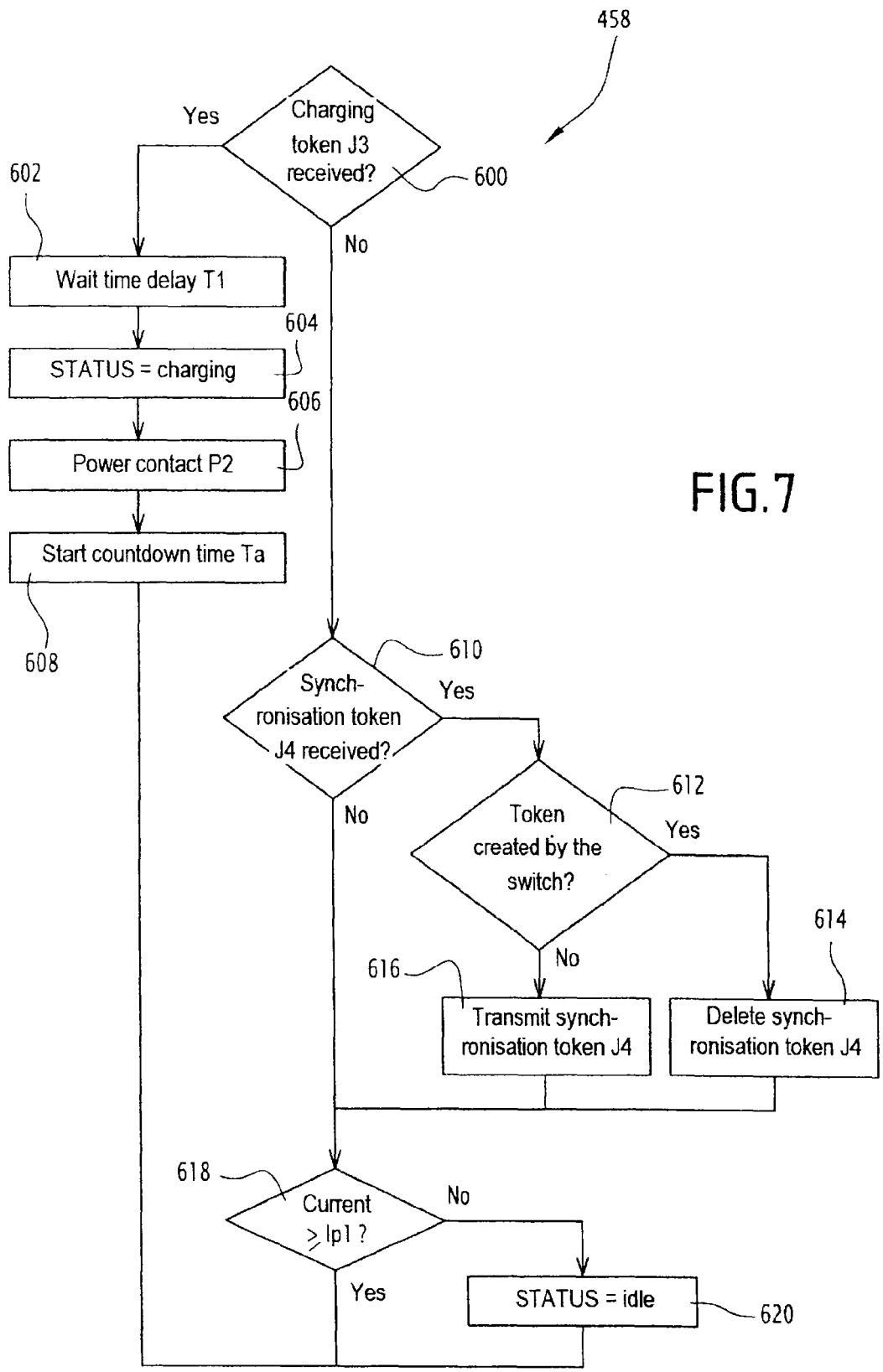
FIG. 7 is a flow chart representing the various steps performed by each control device, during a nominal operating mode and in standby mode.

The algorithm used in standby mode corresponding to the step 458 and to the step 204 is represented in FIG. 7. In the case of operation in standby mode the control device 20, during a step 600, tests whether it has received a charging token J3.

If it has received a charging token J3, the control device 20 does nothing for a first waiting time T1, during a step 602. This enables a charging point 18, corresponding to the previous control device 20 having transmitted charging token J3 received, without receiving any other token itself, to switch from charging at the second power level P2 to charging at the first power level P1. By means of the waiting time T1, any temporary overshoot of the authorised first maximum power P1max is avoided. Then, during a step 604, the corresponding second STATUS variable adopts the "charging" value and, during a step 606, the movable contact 28 is moved to the second position thereof, so that the corresponding point 18 delivers the second power level P2. Then the countdown of the allocation time Ta is activated during a step 608, and the control device exits the standby operating mode thereof. The control device 20 goes to the step 460 shown in FIG. 5.

If the token received is different to a charging token J3, the control device 20 determines during a step 610 whether it consists of a synchronisation token J4.

If the token received is a synchronisation token J4, then the control device 20 performs steps 612, 614, 616 respectively identical to the steps 506, 508 and 510 described above. Following the steps 614 and 616, the control device 20 tests, during a step 618, if the current sensor 24 measures a current greater than or equal to the first charging current Ip1.

Following the step 610, if the token received is different to a synchronisation token J4, the control device 20 goes directly to the step 618.

If the current measured is greater than or equal to the charging current Ip1, the control device 20 exits standby operating mode and goes to the step 460 shown in FIG. 5.

If the current measured is considerably less than the charging current Ip1, for example ten times lower, then the second STATUS variable of the corresponding control device 20 adopts the "idle" value during a step 620 and exits standby operating mode. The control device goes to the step 460 shown in FIG. 5.

Figure 8:
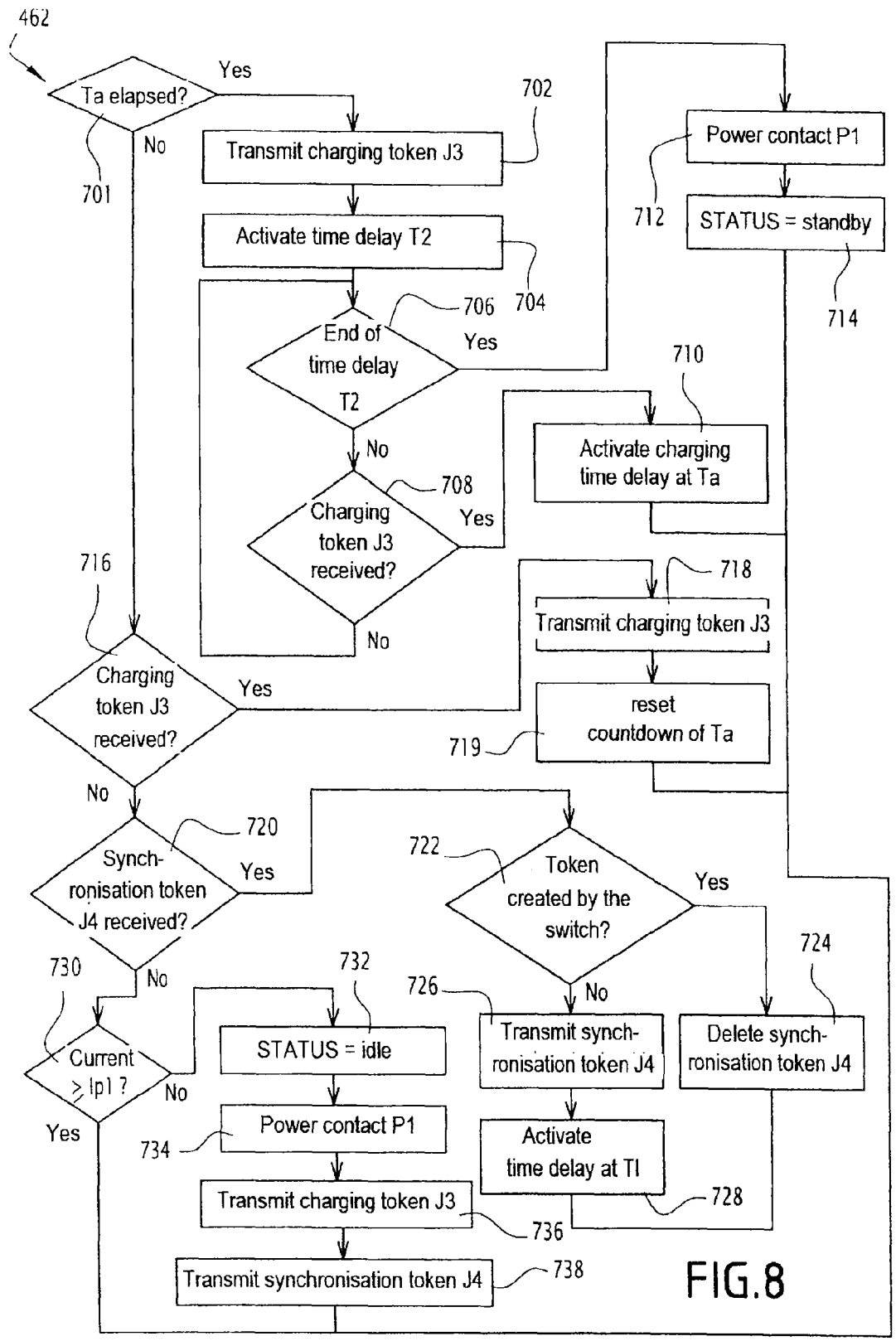
FIG. 8 is a flow chart representing the various steps performed by each control device, during a nominal operating mode and in charging mode.

The algorithm used in charging mode, corresponding to the step 462 and to the step 206, is represented in FIG. 8. During operation in charging mode, the STATUS variable of the corresponding control device 20 has the "charging" value and the control device 20 performs a charging operation algorithm. During a first step 700, the control device tests whether the allocation time Ta has elapsed.

If the allocation time Ta has elapsed then, during a step 702, the corresponding control device 20 transmits the charging token J3 used thereby, to the next control device 20 and activates, during a step 704, a timer, i.e. the countdown of a second waiting time T2, for example in the region of one second. Then, during a step 706, the control device 20 tests whether the second waiting time T2 has elapsed.

While the second waiting time T2 has not elapsed in the step 706, the control device 20 tests during a step 708 whether it has received a charging token J3.

If a charging token J3 is received, then, during a step 710, the control device 20 activates the countdown of the allocation time Ta and the corresponding point 18 continues to deliver the second power level P2.

If no charging token J3 is received and the second standby time T2 has elapsed, then during a step 712, the movable contact 28 is moved to the first position thereof and during a step 714 the corresponding STATUS value adopts the "standby" value. Following the step 714 the control device 20 exit charging operating mode M3 and goes to the step 452 shown in FIG. 5. The second waiting time T2 makes it possible to prevent brief switching of the power delivered by the point 18 between the second power level P2 and the first power level P1.

If, during the step 700, the control device 20 detects that the allocation time Ta has not yet elapsed, then it performs a step 716 during which the control device tests whether it has received a charging token J3.

If a charging token J3 is received, then the control device 20 transmits same to the next control device 20 during a step 718. Indeed, the control device 20 is suitable for only using and storing one charging token J3 at a time. Then, given that the control device 20 has detected that a charging token is circulating on the communication links 30, it resets to zero the countdown of the allocation time Ta during a step 719. In this way, the vehicle 12 connected to the corresponding point will be recharged at the second power level P2 for a longer time than if the countdown were not reset. Following the step 719 the control device 20 exits charging operating mode M3 and goes to the step 452 shown in FIG. 5.

If no charging token is received, then the control device 20 determines whether it has received a synchronisation token J4 during a step 720.

If a synchronisation token is received, then the control device performs steps 722, 724, 726 respectively identical to the steps 612, 614, 616. Following the step 726, the control device 20 performs a step 728 during which it modifies the value of the allocation time Ta and sets same to the latency time T1, for example equal to Ta/2. Then, it activates the countdown of the latency time T1. This makes it possible, when the latency time T1 is very small relative to the allocation time Ta, to accelerate the recirculation of the charging tokens J3 in the event of a modification, upwards or downwards, of the number of vehicles 12 simultaneously connected and charging.

Following the steps 720 or 728 or 724, depending on the case wherein the control device 20 is situated, it performs a step 730 during which it determines whether the current measured by the current sensor 24 is greater than or equal to the charging current Ip1.

If the current measured is considerably less than the charging current Ip1, for example ten times lower, then the control device 20 exits charging operating mode and goes to the step 452 shown in FIG. 5.

If the current measured is greater than or equal to the charging current Ip1, then the control device 20 performs a step 732, wherein the second STATUS variable adopts the "idle" value, as no vehicle 12 is connected to the corresponding point 18 or as the connected vehicle 12 is fully charged. Then, the movable contact 28 is moved to the first position thereof during a step 734, and the charging token J3 used is transmitted to the next control device 20 during a step 736. The control device 20 then generates and transmits during a step 738 a synchronisation token J4 to indicate that charging token J3 is available, i.e. that a power range equal to the partial power P' is available, and resynchronise the circulation of the charging tokens J3. Following the step 738, the control device 20 exits charging operating mode and goes to the step 452 shown in FIG. 5.

In this way, by means of the algorithm 450 corresponding to the method for distributing power, the control devices 20 communicate with each other via the communication links 30 and control the distribution of the first maximum power P1max as a function of time and the number of electric vehicles 12 connected to the charging points 18 and charging. The allocation time Ta and the reiteration of the algorithm 450 make it possible to control the distribution of the maximum power P1max as a function of time. Indeed, if a control device is in charging mode and the allocation time Ta has elapsed, the corresponding second STATUS variable adopts the "standby" value, ensuring the movement of the charging tokens J3 over time and the adaptability of the system 10.

During the method for distributing the charge, when connecting an electric vehicle 12 to a charging point 18, said vehicle is at least charged with the first power level P1, enabling the start of a further charging cycle without conditions and the detection of this event by the control device 20 merely by measuring the current by the sensor 24, since the movable contact 28 has only two positions, corresponding either to charging at the first power level P1, or to charging at the second power level P2.

Furthermore, the charging tokens J3 circulating regularly between the control devices 20, the charging system 10 is suitable for the connection of an additional vehicle 12 or the disconnection of a vehicle 12. Indeed, each control device 20 is suitable for switching to idle mode at the end of a charging cycle when it is in standby mode or in charging mode, as shown in FIG. 2. Moreover, each control device 20 is suitable for starting a charging cycle and switching to standby mode following the connection of a vehicle.

As shown in FIG. 6 with the steps 500 and 502, each control device 20 is suitable for using and storing the charging token J3 received thereby when the corresponding charging point 18 is connected to an electric vehicle 12 requiring electric charging. Indeed, if the corresponding control device 20 is in idle mode, it performs on receipt of a charging token J3 the steps 500 and 502, i.e. it transmits the charging token J3 received to the next control device, and it is thus not suitable for using same.

Furthermore, it can be seen in FIG. 8, corresponding to a charging operating mode, that when a control device 20 is in charging mode, if it receives a charging token J3 while it is already using a charging token J3 and delivering the second power level P2, it transmits to the next control device the charging token J3 received, as shown in the step 718. In this way, when a control device uses a charging token J3 and the corresponding charging point 18 thereof delivers the second power level P2, it is not suitable for using the charging token J3 received and delivering the corresponding additional partial power P'.

It is thus obvious that each charging token J3 generated by the master control device 20B on initialisation in mode R1 is transmitted from a control device 20 to the next control device 20, until a control device 20 is suitable for using same, stores same and thus allocates the corresponding additional partial power P' to the corresponding charging point 18 for the allocation time Ta. Then, after the allocation time Ta has elapsed, the charging token J3 is transmitted to the next control device 20, as shown in the step 702.

Figure 9:
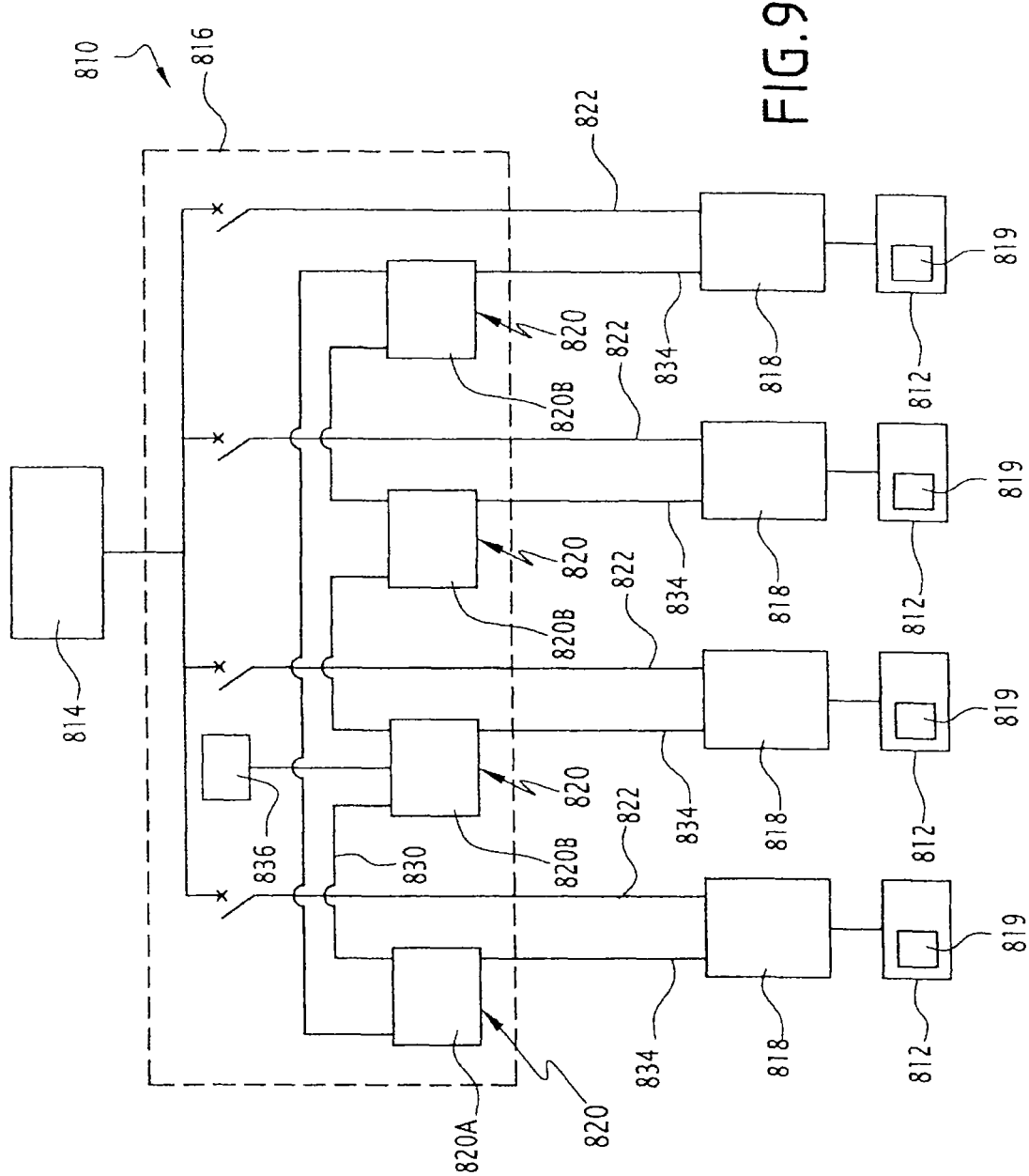
FIG. 9 is a similar view to that in FIG. 1 according to a second embodiment of the invention.

FIG. 9 illustrates a charging system 810 according to a second embodiment of the invention, wherein the elements similar to those of the first embodiment bear the reference numbers of the first embodiment increased by 800.

In this way, each charging system 810 is suitable for electrically charging a plurality of electric vehicles 812 and comprises an electric power supply 814, an electric panel 816, four charging points 818. Each electric vehicle 812 comprises a battery 819 and each charging point 818 is associated with a control device 820. A first electric line 822 connects each charging point 818 to the electric power supply 814. The control devices 820 are connected by communication links 830 and form a closed communication loop.

The electric panel 816 comprises an electric meter 836 suitable for transmitting, for example pricing information or a set-point provided by an energy distributor.

The control device 820A operating in master mode is connected to the electric meter 836.

Each control device 820 is suitable for transmitting the control signal S1 to the corresponding charging point 818. The control signal S1 being suitable for controlling the power level delivered by the charging point 818 to a vehicle 812 connected thereto.

In the charging system 810, according to the second embodiment, for each control device 820, the movable contact 28 and the second electric line 26 from the first embodiment are replaced by a bidirectional communication link 834. In this way, the control signal S1 and the corresponding control device 820 are suitable for controlling the corresponding charging point 818 so that it delivers a plurality of power levels.

Moreover, the tokens J1, J2, J3, J4 identical to those described for the first embodiment and bearing the same references are suitable for circulating between the control devices 820 on the communication links 830.

The bidirectional link 834 enables each charging point 818 to indicate to the corresponding control device 820 that an electric vehicle 812 is connected thereto and requires charging. In this way, the corresponding control device 820 is suitable for transmitting the control signal S1 to the corresponding charging point 818 and controlling a certain charging power level. There is no power reserve corresponding to the first power level P1 which is systematically allocated to a point not connected to a vehicle 12. Indeed, in this embodiment, when a charging point 818 is not used, the control device 820 does not allocate the power level P1 thereto, since, on connection of an electric vehicle 812 to this point 818, the control device is suitable for detecting this connection whereas, in the first embodiment, the current sensor 24 would be suitable for detecting this connection. However, to detect the connection of an electric vehicle 12 with the current sensor 24, in the first embodiment, it is necessary at all times to allocate the first power level P1 to the corresponding charging point 18.

By means of the bidirectional link 834, the control device 820 continuously knows a consumed power Pc by the corresponding point 818, and is then suitable for deducing therefrom the power actually absorbed by the electric vehicle 812 charging. If the consumed power Pc is less than the power allocated by the corresponding switch 820, the control device 820 is suitable for setting a difference between the allocated power and the consumed power Pc available to the other points 818. For this, the corresponding control device 820 creates charging tokens J3 similar to the charging tokens J3 described for the first embodiment, transmitted on the communication links 830 between the control devices 820. These charging tokens J3 are deleted by the corresponding control device 820 that created same, if the consumed power Pc is no longer less than the allocated power.

By means of the electric meter 836, the master control device 820A receives the pricing information and knows the total power consumed by the charging system 810. Based on this information, the master control device 820A is suitable at any time for creating of deleting charging tokens J3 in circulation. It is thus possible to adjust the first maximum power P1max delivered according to the pricing period, or a set-point provided by the energy distributor, and thus change the distribution of the first maximum power P1max between the charging points 818 and the corresponding control devices 820.

Each charging token J3 corresponds, as in the first embodiment, to an authorised partial power P'. However, in this second embodiment, the partial power P' is not necessarily dependent, unlike the first embodiment, on the first power level P1. Indeed, there is no power reserve corresponding to the first power level P1 which is systematically allocated to each charging point 18. For each charging token J3 created, the associated partial power P' is always the same.

In the first embodiment, each control device 20 is suitable for storing and using a single charging token J3 at the same time, that it stores for the allocation time Ta. According to this second embodiment, each control device 820 is suitable for simultaneously storing a plurality of charging tokens J3 making it possible to increase the instantaneous power that the associated charging point 818 is authorised to deliver. A control device 820 is thus suitable for storing a maximum number of charging tokens for which the sum of the corresponding partial powers P' corresponds to a second maximum power P2max, and when it receives a number of charging tokens greater than this maximum number, the control device 820 is suitable for forwarding same. The second maximum power P2max corresponds to a maximum power that a charging point 818 is suitable for delivering. It is thus possible to allocate a plurality of power ranges, i.e. several times the power level P' to the same point 818. Being able to allocate the partial power level P' several times to the same point 818 enables precise control of the distribution of the first maximum power P1max, essentially when the partial power level P' is low in value compared to the first maximum power, for example one hundred times lower, and the number of charging tokens J3 is then high.

Alternatively, the allocation time Ta varies according to the control device 820. In this way, the control device 820 is suitable for storing the charging tokens J3 for a variable time according to the allocation time Ta associated with said control device 820. This makes it possible to manage the charging priorities between various charging points 818. For example, for a charging point 818 having a high priority, the corresponding control device 820 uses a charging token J3 on starting charging and only releases same at the end of charging. According to this alternative embodiment, the priority is configured merely at the charging point 818 or at the control device 820, using for example a thumb wheel, not shown.

FIG. 10 illustrates a charging system 910 according to a third embodiment of the invention, wherein the elements similar to those of the second embodiment have the reference numbers of the second embodiment increased by 100.

According to this third embodiment, the charging system 910 is identical to the charging system 810 with the sole difference being that each control device 920 is comprised in the corresponding charging point 918. In this way, the control devices 920 are integrated in the charging points 918, and the bidirectional link 834 of the second embodiment is withdrawn.

The operation of the charging system 910 is similar to the operation of the charging system 810 and the bidirectional communication between each control device 920 and the corresponding charging point 918 is maintained.

For the charging systems 810 and 910, the operation is similar to that described for the first embodiment, the algorithms having however the following differences: the number of charging tokens J3 exchanged between or used by the control devices 820, 920, varies over time and is equal to the first maximum power P1max delivered by the electric power supply 814, 914, divided by the partial power P'. A control device 820, 920 can simultaneously consume the same number of charging tokens J3 as partial power ranges P' included in the second maximum power P2max as the corresponding point 818, 918 is capable of delivering. The master control device 820A, 920A creates the new charging tokens J3 when the first maximum power P1max increases and circulates the charging tokens J3 between the control devices 820, 920.

Furthermore, a deletion token J5 is used to delete a charging token J3. When the first maximum power P1max decreases, the master control device 820A, 920A, creates the same number of deletion tokens J5 as the tokens J3 to be deleted and circulates same between the control devices 820, 920. A control device 820, 920, receiving a deletion token J5 and which is in the process of using at least one charging token J3 requests the corresponding point 818, 918 to reduce the power delivered to the vehicle 812, 912 thereof by a partial power range P', then deletes the charging token J3 used along with the token J5. A control device 820, 920 receiving a deletion token J5 whereas it is not using any charging token J3 transmits the token J5 to the next control device 820, 920. The master control device 820A, 920A deletes the deletion token J5 when it receives the deletion token J5 and deletes also the next charging token J3 that it will receive.

The second and third embodiments provide additional information and make it possible, as explained above, to have a more complex charging system 810, 910, suitable for managing charging priorities and adapting the first maximum power P1max and the power level delivered according to the pricing information received via the electric meter 836, 936.

The charging systems 10, 810, 910 thus make it possible to simultaneously charge a plurality of vehicles 12, 812, 912 while continuously maximising the average charging power of the electric vehicles according to the number of electric vehicles 12 connected to the system 10, 810, 910.

Furthermore, in the charging systems 10, 810, 910, the charging cycle of the batteries 19, 819, 919 is never interrupted, since each battery is charged at least with the first power level P1.

The charging systems 10, 810, 910 represented in FIGS. 1, 9 and 10 comprise control devices 20, 820, 920 forming a closed communication loop.

Alternatively, the control devices 20, 820, 920 communicate via wireless links and/or an Ethernet network, not shown. More generally, all types of network can be envisaged to establish communication between the control devices 20, 820, 820.

The invention claimed is:

1. An electric charging system of a plurality of electric vehicles, said system comprising:
   an electric power supply configured to deliver a maximum electric power;
   a plurality of charging points, each configured to be connected to an electric vehicle and recharge a battery of said electric vehicle, and deliver a plurality of electric power levels, each charging point being connected, via a corresponding electric line, to the electric power supply; and
   for each charging point, a control device configured to control the electric power level delivered by the charging point to the electric vehicle connected thereto, the control device being configured to transmit a control signal to the corresponding charging point, said electric power level delivered being dependent on said control signal, wherein
   the control devices are connected to each other by communication links,
   at least one of the control devices generates charging tokens to circulate between the control devices on the communication links, each charging token being associated with a partial power, corresponding to a subdivision of the maximum electric power and a sum of the partial powers associated with the charging tokens being less than or equal to the maximum electric power, and
   the control devices are configured to control, using the charging tokens, the distribution of the maximum electric power between the charging points as a function of time and a number of electric vehicles connected to the charging points and requiring charging.

2. The system according to claim 1, wherein each control device is connected, via the communication links, to two control devices, forming a chained link, corresponding to a closed communication loop.

3. The system according to claim 1, wherein communication between the control devices is a point-to-point type communication, wherein the control devices are configured to be in master or slave mode, and wherein the system includes one control device configured in master mode.

4. The system according to claim 3, wherein the control device configured in master mode is connected to an electric meter, and wherein based on information received from the electric meter, the control device configured in master mode is configured to communicate with the control devices configured in slave mode to modify the maximum electric power consumable by modifying the distribution of the maximum electric power.

5. The system according to claim 1, further comprising a bidirectional electric link between each charging point and each corresponding control device, and wherein the charging point is configured to indicate to the corresponding control device that an electric vehicle is connected thereto and that the electric vehicle requires charging of its battery.

6. The system according to claim 1, wherein each control device comprises a current sensor configured to measure the current flowing through the corresponding electric line and detect connection of an electric vehicle to the corresponding charging point and the charging of said electric vehicle based on the value of said current.

7. The system according to claim 1, wherein each charging point comprises the corresponding control device.

8. A method for distributing electric power delivered by an electric power supply of an electric charging system of a plurality of electric vehicles, the electric power supply being configured to deliver a maximum electric power, the charging system including a plurality of charging points, each being configured to be connected to an electric vehicle and recharge a battery of said electric vehicle, and deliver a plurality of electric power levels, each charging point being connected, via a corresponding electric line, to the electric power supply, and for each charging point, a control device configured to control the electric power level delivered by the charging point to an electric vehicle connected thereto, the method comprising:
   a) transmitting, by each control device, a control signal to the corresponding charging point, said delivered electric power level being dependent on said control signal;
   b) establishing communication between the control devices via communication links, generating, by at least one of the control devices, charging tokens and sending the charging tokens on the communication links to circulate between the control devices, each charging token being associated with a partial power, corresponding to a subdivision of the maximum electric power, a sum of the partial powers associated with the charging tokens being less than or equal to the maximum electric power; and
   c) controlling, by the control devices, distribution of the maximum electric power between the charging points using the charging tokens and as a function of time and a number of electric vehicles connected to the charging points and requiring charging, the control devices controlling the circulation of the charging tokens between the control devices.

9. The method according to claim 8, wherein during step a) controlling, by each control device, the corresponding charging point via the control signal such that the corresponding charging point delivers at least a minimum electric power when an electric vehicle is connected thereto and requires charging of its battery.

10. The method according to claim 8, wherein during step c), when a control device receives a charging token, using the charging token received only in response to the control device already using a number of charging tokens less than a maximum authorised number and when the corresponding charging point is connected to an electric vehicle requiring charging of its battery, and otherwise transmitting, by the control device, the charging token to another control device via the communication links.

11. The method according to claim 10, wherein when, during step c) a control device uses a charging token, then storing the charging token for a predetermined allocation time before forwarding the charging token to another control device via the communication links and allocating, via the control signal, the corresponding partial power, to the corresponding charging point during the allocation time.

12. The method according to claim 8, wherein each control device is connected, via the communication links, to two control devices, forming a chained link, corresponding to a closed communication loop, and wherein during steps b) and c), circulating the charging tokens in a single direction between the control devices via the communication links.

13. The method according to claim 12, wherein during step c), in response to a control device detecting a start of charging of a battery of an electric vehicle connected to the corresponding charging point or an end of charging of the battery of said electric vehicle, transmitting a synchronisation token, by the control device, to the other control devices, the synchronisation token circulating in a single direction between the control devices, and wherein when receiving the synchronisation token, resetting, by the control devices holding a charging token, the allocation time to a latency time and storing the charging token further for the latency time, the synchronisation token being transmitted from control device to control device.

14. The method according to claim 13, further comprising deleting the synchronisation token by the control device, which generated the synchronisation token, when the control device receives the synchronisation token.

\* \* \* \* \*